United States Patent
Zhou et al.

(10) Patent No.: US 11,805,453 B2
(45) Date of Patent: Oct. 31, 2023

(54) SECURITY KEY IN LAYER 1 (L1) AND LAYER 2 (L2) BASED MOBILITY

(71) Applicant: QUALCOMM Incorporated, San Diego, CA (US)

(72) Inventors: Yan Zhou, San Diego, CA (US); Hamed Pezeshki, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/365,386

(22) Filed: Jul. 1, 2021

(65) Prior Publication Data
US 2022/0007242 A1 Jan. 6, 2022

Related U.S. Application Data

(60) Provisional application No. 63/047,623, filed on Jul. 2, 2020.

(51) Int. Cl.
*H04W 36/00* (2009.01)
(52) U.S. Cl.
CPC ................ *H04W 36/0077* (2013.01)
(58) Field of Classification Search
CPC ........... H04W 12/041; H04W 36/0038; H04W 12/03; H04W 36/0033; H04W 36/0077; H04W 12/08; H04W 36/24; H04W 36/0055; H04W 12/043
See application file for complete search history.

(56) References Cited

U.S. PATENT DOCUMENTS

| | | | |
|---|---|---|---|
| 2005/0075136 A1* | 4/2005 | Cromer | H01Q 1/2266 455/556.1 |
| 2012/0008776 A1 | 1/2012 | Shida et al. | |
| 2018/0091485 A1 | 3/2018 | Lee et al. | |
| 2018/0324160 A1 | 11/2018 | Axen et al. | |
| 2020/0351977 A1* | 11/2020 | Wang | H04W 76/18 |
| 2020/0374072 A1* | 11/2020 | Ren | H04L 1/0041 |
| 2021/0120466 A1* | 4/2021 | Kim | H04W 36/0038 |
| 2021/0127270 A1* | 4/2021 | Yang | H04W 76/19 |
| 2022/0271821 A1* | 8/2022 | Farag | H04W 72/23 |
| 2023/0007499 A1* | 1/2023 | Da Silva | H04W 24/02 |
| 2023/0067619 A1* | 3/2023 | Zhang | H04L 5/0051 |

OTHER PUBLICATIONS

International Search Report and Written Opinion—PCT/US2021/040251—ISA/EPO—dated Oct. 26, 2021.

* cited by examiner

*Primary Examiner* — Allahyar Kasraian
(74) *Attorney, Agent, or Firm* — QUALCOMM Incorporated

(57) ABSTRACT

Certain aspects of the subject matter described in this disclosure can be implemented in a method for wireless communication by a user equipment (UE). The method generally includes receiving lower layer signaling indicating that the UE is to handover to one or more first physical cell identifiers (PCIs) to be used for communication between the UE and the BS and communicating with the BS in accordance with a security key and using the one or more first PCIs, the security key being associated with a PCI.

30 Claims, 9 Drawing Sheets

500

505

TRANSMIT, BY A BASE STATION (BS), TO A USER EQUIPMENT (UE), LOWER LAYER SIGNALING INDICATING THAT THE UE IS TO HANDOVER TO ONE OR MORE FIRST PHYSICAL CELL IDENTIFIERS (PCIs) TO BE USED FOR COMMUNICATION BETWEEN THE UE AND THE BS

510

COMMUNICATE, BY THE BS, WITH THE UE IN ACCORDANCE WITH A SECURITY KEY AND USING THE ONE OR MORE FIRST PCIs, THE SECURITY KEY BEING ASSOCIATED WITH A PCI

RECEIVE, BY A USER EQUIPMENT (UE), LOWER LAYER SIGNALING INDICATING THAT THE UE IS TO HANDOVER TO ONE OR MORE FIRST PHYSICAL CELL IDENTIFIERS (PCIS) TO BE USED FOR COMMUNICATION BETWEEN THE UE AND A BASE STATION (BS)

610

COMMUNICATE, BY THE UE, WITH THE BS IN ACCORDANCE WITH A SECURITY KEY AND USING THE ONE OR MORE FIRST PCIS, THE SECURITY KEY BEING ASSOCIATED WITH A PCI

SECURITY KEY IN LAYER 1 (L1) AND LAYER 2 (L2) BASED MOBILITY

CROSS-REFERENCE TO RELATED APPLICATION(S)

This application claims benefit of and priority to U.S. Provisional Application No. 63/047,623 filed Jul. 2, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for security key derivation.

Description of the Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved security protocols.

Certain aspects of the subject matter described in this disclosure can be implemented in a method for wireless communication by a user equipment (UE). The method generally includes: receiving lower layer signaling indicating that the UE is to handover to one or more first physical cell identifiers (PCIs) to be used for communication between the UE and a base station (BS); and communicating with the BS in accordance with a security key and using the one or more first PCIs, the security key being associated with a PCI.

Certain aspects of the subject matter described in this disclosure can be implemented in a method for wireless communication by a BS. The method generally includes: transmitting, to a UE, lower layer signaling indicating that the UE is to handover to one or more first PCIs to be used for communication between the UE and the BS; and communicating with the UE in accordance with a security key and using the one or more first PCIs, the security key being associated with a PCI.

Certain aspects of the subject matter described in this disclosure can be implemented in an apparatus for wireless communication by a UE. The apparatus generally includes: a memory; and one or more processors coupled to the memory, the memory and the one or more processors being configured to: receive lower layer signaling indicating that the UE is to handover to one or more first PCIs to be used for communication between the UE and a BS; and communicate with the BS in accordance with a security key and using the one or more first PCIs, the security key being associated with a PCI.

Certain aspects of the subject matter described in this disclosure can be implemented in an apparatus for wireless communication by a BS. The apparatus generally includes: a memory; and one or more processors coupled to the memory, the memory and the one or more processors being configured to: transmit, to a UE, lower layer signaling indicating that the UE is to handover to one or more first PCIs to be used for communication between the UE and the BS; and communicate with the UE in accordance with a security key and using the one or more first PCIs, the security key being associated with a PCI.

Certain aspects of the subject matter described in this disclosure can be implemented in an apparatus for wireless communication by a UE. The method generally includes: means for receiving lower layer signaling indicating that the UE is to handover to one or more first PCIs to be used for communication between the UE and a BS; and means for communicating with the BS in accordance with a security key and using the one or more first PCIs, the security key being associated with a PCI.

Certain aspects of the subject matter described in this disclosure can be implemented in an apparatus for wireless communication by a BS. The method generally includes: means for transmitting, to a UE, lower layer signaling indicating that the UE is to handover to one or more first PCIs to be used for communication between the UE and the BS; and means for communicating with the UE in accordance with a security key and using the one or more first PCIs, the security key being associated with a PCI.

Certain aspects of the subject matter described in this disclosure can be implemented in a computer-readable medium having instructions stored thereon to cause a UE to receive lower layer signaling indicating that the UE is to handover to one or more first PCIs to be used for communication between the UE and a BS; and communicate with the BS in accordance with a security key and using the one or more first PCIs, the security key being associated with a PCI.

Certain aspects of the subject matter described in this disclosure can be implemented in a computer-readable medium having instructions stored thereon to cause a BS to transmit, to a UE, lower layer signaling indicating that the UE is to handover to one or more first PCIs to be used for communication between the UE and the BS; and communicate with the UE in accordance with a security key and using the one or more first PCIs, the security key being associated with a PCI.

Certain aspects of the subject matter described in this disclosure can be implemented in a method for wireless communication by a UE. The method generally includes: receiving, from a BS, lower layer signaling indicating that the UE is to handover to one or more first PCIs to be used for communication between the UE and the base station; determining a security key for the communication with the BS in response to the lower layer signaling, the security key being determined based on a PCI; and communicating with the BS in accordance with the security key and using the one or more first PCIs.

Certain aspects of the subject matter described in this disclosure can be implemented in a method for wireless communication by a BS. The method generally includes: transmitting, to a UE, lower layer signaling indicating that the UE is to handover to one or more first PCIs to be used for communication between the UE and the BS; determining a security key for the communication based on a PCI; and communicating with the UE in accordance with the security key and using the one or more first PCIs.

Certain aspects of the subject matter described in this disclosure can be implemented in an apparatus for wireless communication by a UE. The apparatus generally includes: a memory; and one or more processors coupled to the memory, the memory and the one or more processors being configured to receive, from a BS, lower layer signaling indicating that the UE is to handover to one or more first PCIs to be used for communication between the UE and the base station; determine a security key for the communication with the BS in response to the lower layer signaling, the security key being determined based on a PCI; and communicate with the BS in accordance with the security key and using the one or more first PCIs.

Certain aspects of the subject matter described in this disclosure can be implemented in an apparatus for wireless communication by a BS. The apparatus generally includes: a memory; and one or more processors coupled to the memory, the memory and the one or more processors being configured to transmit, to a UE, lower layer signaling indicating that the UE is to handover to one or more first PCIs to be used for communication between the UE and the BS; determine a security key for the communication based on a PCI; and communicate with the UE in accordance with the security key and using the one or more first PCIs.

Certain aspects of the subject matter described in this disclosure can be implemented in an apparatus for wireless communication by a UE. The method generally includes: means for receiving, from a base station, lower layer signaling indicating that the UE is to handover to one or more first PCIs to be used for communication between the UE and the BS; means for determining a security key for the communication with the BS in response to the lower layer signaling, the security key being determined based on a PCI; and means for communicating with the BS in accordance with the security key and using the one or more first PCIs.

Certain aspects of the subject matter described in this disclosure can be implemented in an apparatus for wireless communication. The method generally include: means for transmitting, to a UE, lower layer signaling indicating that the UE is to handover to one or more first PCIs to be used for communication between the UE and the BS; means for determining a security key for the communication based on a PCI; and means for communicating with the UE in accordance with the security key and using the one or more first PCIs.

Certain aspects of the subject matter described in this disclosure can be implemented in a computer-readable medium having instructions stored thereon to cause a UE to receive, from a BS, lower layer signaling indicating that the UE is to handover to one or more first PCIs to be used for communication between the UE and the BS; determine a security key for the communication with the BS in response to the lower layer signaling, the security key being determined based on a PCI; and communicate with the BS in accordance with the security key and using the one or more first PCIs.

Certain aspects of the subject matter described in this disclosure can be implemented in a computer-readable medium having instructions stored thereon to cause a BS to transmit, to a UE, lower layer signaling indicating that the UE is to handover to one or more first PCIs to be used for communication between the UE and the BS; determine a security key for the communication based on a PCI; and communicate with the UE in accordance with the security key and using the one or more first PCIs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

FIG. 5 is a flow diagram illustrating example operations for wireless communication by a BS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
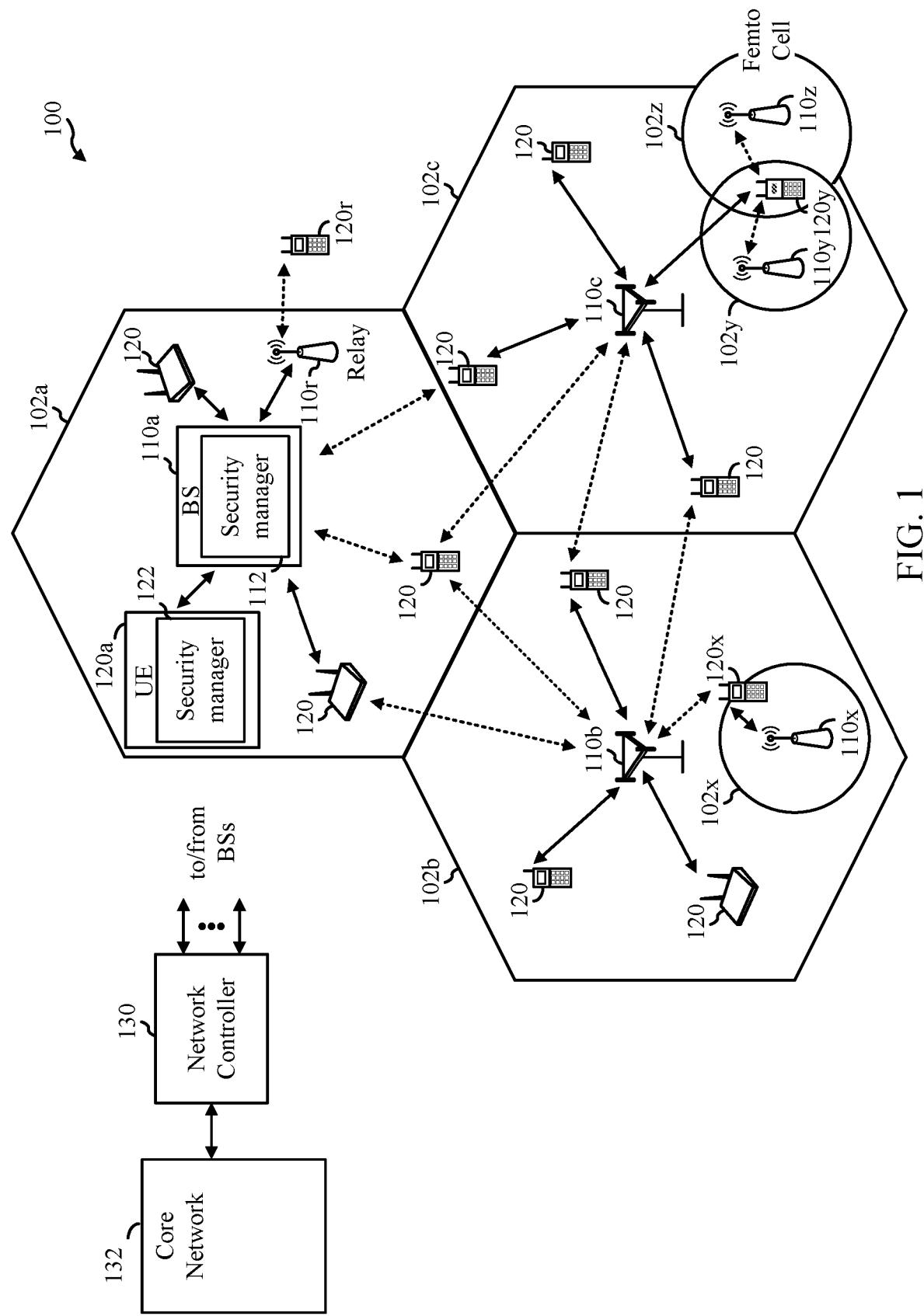
FIG. 1 is a block diagram conceptually illustrating an example telecommunications system, in accordance with certain aspects of the present disclosure.

Aspects of the present disclosure provide apparatus, methods, processing systems, and computer readable mediums for security key derivation for lower layer (e.g., layer 1 (L1)/layer 2 (L2)) based mobility. For example, lower layer signaling (e.g., downlink control information (DCI) or medium access control (MAC)-control element (CE)) may be used to handover a UE from a source physical cell identifier (PCI) to one or more target PCIs. In some cases, the one or more target PCIs may be multiple PCIs associated with the same serving cell. Certain aspects of the present disclosure are generally directed to techniques for determination (e.g., derivation) of a security key after the L1/L2 based handover, especially in scenarios where multiple target PCIs are selected to serve the UE.

In some aspects, the security key may not be changed upon handover if the source and target PCIs are associated with the same serving cell. In certain aspects, a base station (BS) may indicate to the UE the PCI to be used for determining the security key. In some cases, the PCI to be used for security key derivation may be implied. In other words, the PCI may be determined based on a configured rule, such as using the PCI with the lowest or highest identifier, the PCI selected by the UE first in time for communication.

The following description provides examples of security generation in communication systems, and is not limiting of the scope, applicability, or examples set forth in the claims. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UE 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS 110 may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for security key derivation. As shown in FIG. 1, the BS 110*a* includes a security manager 112. The security manager 112 may be configured to transmit, to a UE, lower layer signaling indicating one or more first PCIs to be used for communication between the UE and a BS and communicate with the UE in accordance with a security key and using the one or more first PCIs, the security key being associated with a PCI, in accordance with aspects of the present disclosure.

As shown in FIG. 1, the UE 120*a* includes a security manager 122. The security manager 122 may be configured to receive, from a BS, lower layer signaling indicating one or more first PCIs to be used for communication between the UE and the BS, and communicate with the BS in accordance with the security key and using the one or more first PCIs, the security key being associated with a PCI, in accordance with aspects of the present disclosure.

Figure 2:
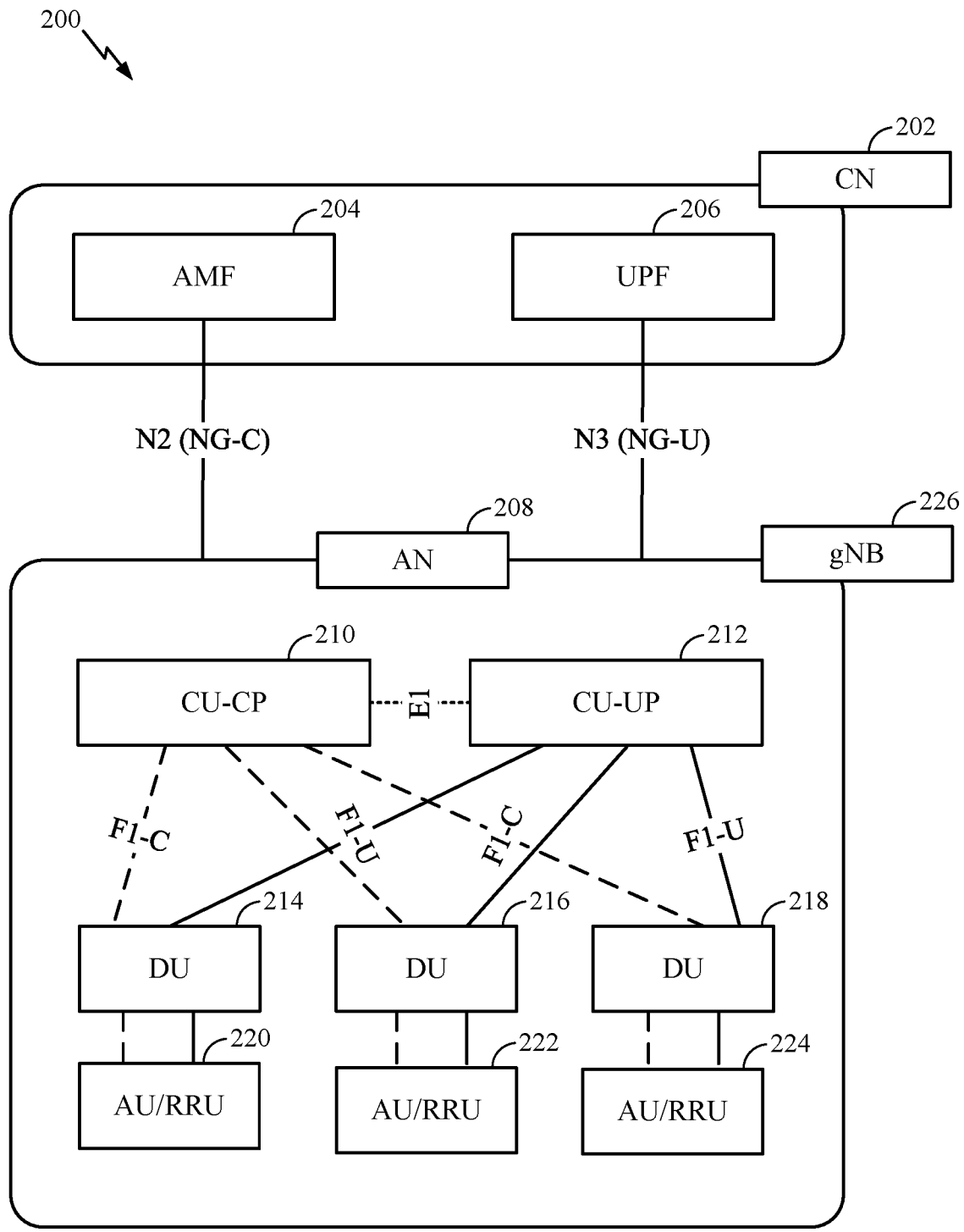
FIG. 2 is a block diagram illustrating an example architecture of a distributed radio access network (RAN), in accordance with certain aspects of the present disclosure.

FIG. 2 illustrates an example architecture of a distributed RAN 200, which may be implemented in the wireless communication network 100 illustrated in FIG. 1. As shown in FIG. 2, the distributed RAN includes core network (CN) 202 and access node 208 (e.g., BS 110*a* of FIG. 1).

The CN 202 may host core network functions. CN 202 may be centrally deployed. CN 202 functionality may be offloaded (e.g., to advanced wireless services (AWS)), in an effort to handle peak capacity. The CN 202 may include the Access and mobility management function (AMF) 204 and user plane function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more DUs 214-218, and one or more antenna/remote radio units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNB s/BSs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE 120*a*). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more transmit/receive points (TRP(s)) (which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using bearer context management functions. Data forwarding between CU-UP(s) 212 may be via an Xn-U interface.

The distributed RAN 200 may support front-hauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common front-haul for LTE and NR. The distributed RAN 200 may enable cooperation between and among DUs 214-218, for example, via the CU-CP 212. An inter-DU interface may not be used.

Figure 3:
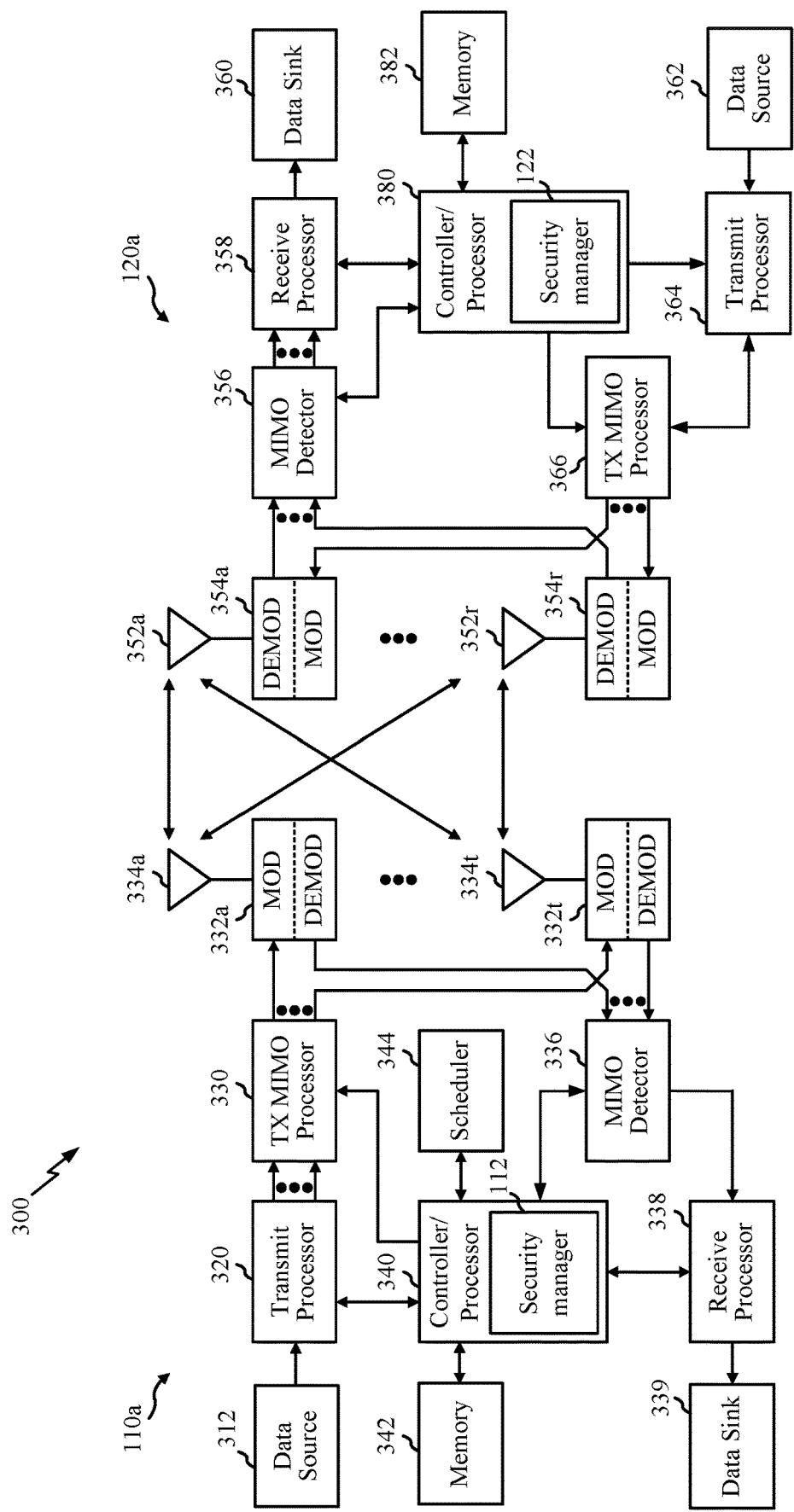
FIG. 3 is a block diagram conceptually illustrating a design of an example a base station (BS) and user equipment (UE), in accordance with certain aspects of the present disclosure.

FIG. 3 illustrates example components of BS 110*a* and UE 120*a* (e.g., in the wireless communication network 100 of FIG. 1), which may be used to implement aspects of the present disclosure.

At the BS 110*a*, a transmit processor 320 may receive data from a data source 312 and control information from a controller/processor 340. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and channel state information reference signal (CSI-RS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a*-332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink (DL) signal. DL signals from modulators 332a-332t may be transmitted via the antennas 334a-334t, respectively.

At the UE 120a, the antennas 352a-352r may receive the DL signals from the BS 110a and may provide received signals to the demodulators (DEMODs) in transceivers 354a-354r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a-354r, perform MIMO detection on the received symbols if applicable, and provide detected symbols. A receive processor 358 may process (e.g., demodulate, deinterleave, and decode) the detected symbols, provide decoded data for the UE 120a to a data sink 360, and provide decoded control information to a controller/processor 380.

On the uplink (UL), at UE 120a, a transmit processor 364 may receive and process data (e.g., for the PUSCH) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for single-carrier frequency division multiplexing (SC-FDM), etc.), and transmitted to the BS 110a. At the BS 110a, the UL signals from the UE 120a may be received by the antennas 334, processed by the modulators 332, detected by a MIMO detector 336 if applicable, and further processed by a receive processor 338 to obtain decoded data and control information sent by the UE 120a. The receive processor 338 may provide the decoded data to a data sink 339 and the decoded control information to the controller/processor 340.

The memories 342 and 382 may store data and program codes for BS 110a and UE 120a, respectively. A scheduler 344 may schedule UEs for data transmission on the DL and/or UL.

Antennas 352, processors 366, 358, 364, and/or controller/processor 380 of the UE 120a and/or antennas 334, processors 320, 330, 338, and/or controller/processor 340 of the BS 110a may be used to perform the various techniques and methods described herein. For example, as shown in FIG. 2, the controller/processor 340 of the BS 110a has a security manager 112, according to aspects described herein. As shown in FIG. 2, the controller/processor 380 of the UE 120a has a security manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 4:
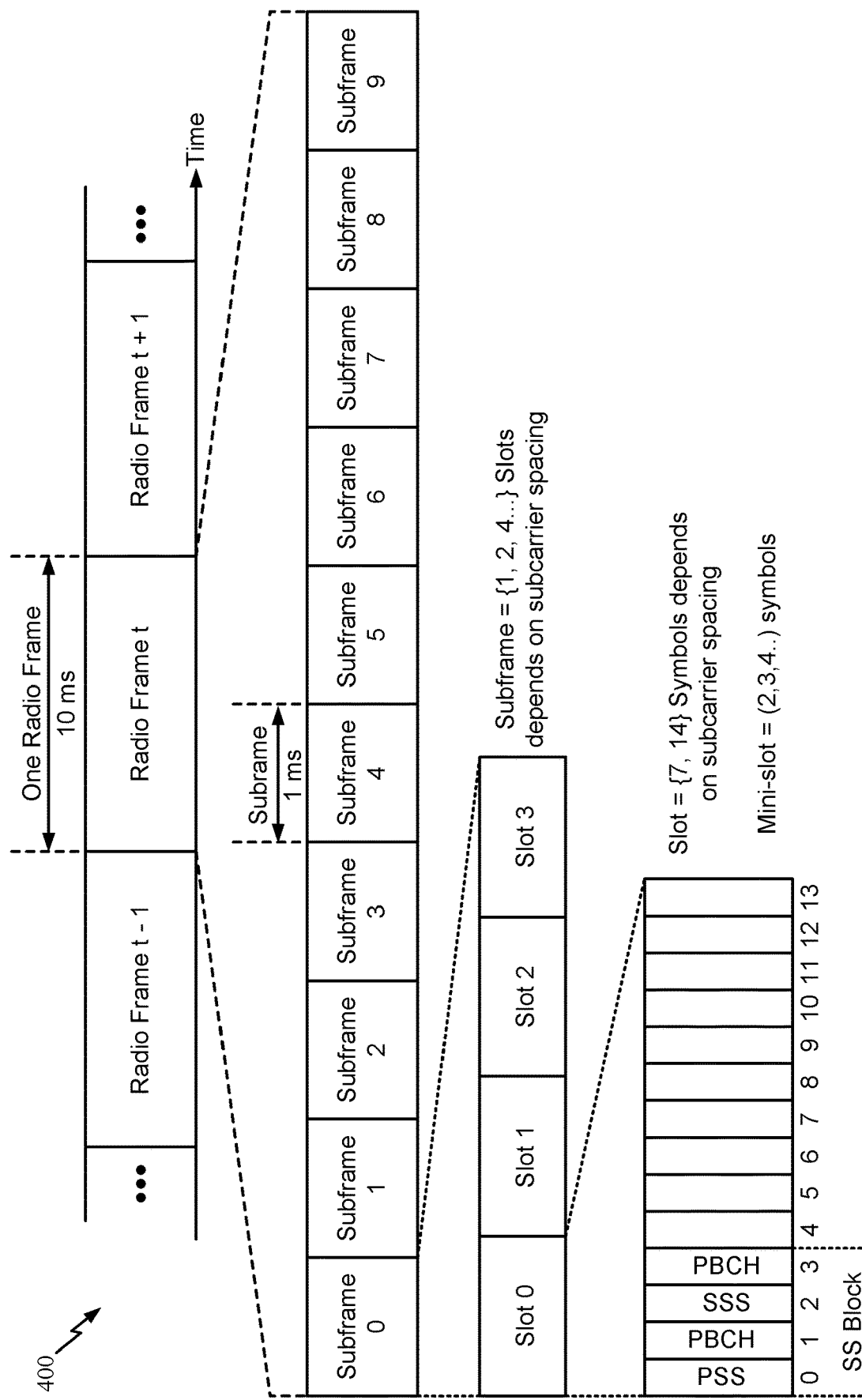
FIG. 4 is an example frame format for new radio (NR), in accordance with certain aspects of the present disclosure.

FIG. 4 is a diagram showing an example of a frame format 400 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Security Key Derivation in Layer 1 (L1) and Layer 2 (L2) Based Mobility Security key encryption of communications between a BS and a UE may be updated during handover. For example, a new key may be generated as a function of the target cell's physical cell identifier (ID) (PCI) and the absolute radio-frequency channel number in downlink (DL) (ARFCN-DL). For instance, a UE and a gNB/next-generation (ng)-eNB may use a security key ($K_{gNB}$) to secure the communication between each other.

On handovers and at transitions from radio resource control (RRC) inactive mode (RRC INACTIVE) to RRC connected mode (RRC CONNECTED) states, the basis for $K_{gNB}$ that may be used between the UE and the target gNB/ng-eNB (e.g., referred to as $K_{NG-RAN}^*$), may be derived from either the currently active $K_{gNB}$ or from a next-hop (NH) parameter. If $K_{NG-RAN}^*$ is derived from the currently active $K_{gNB}$, this may be referred to as a horizontal key derivation, and if the $K_{NG-RAN}^*$ is derived from the NH parameter, the derivation may be referred to as a vertical key derivation. On handovers with vertical key derivation, the NH may be further bound to the target PCI and its frequency ARFCN-DL before it is taken into use as the $K_{gNB}$ in the target gNB/ng-eNB. On handovers with horizontal key derivation, the currently active $K_{gNB}$ may be further bound to the target PCI and its frequency ARFCN-DL before it is taken into use as the $K_{gNB}$ in the target gNB/ng-eN. Thus, the security key generation is a function of PCI and the associated ARFCN-DL.

Layer 1 (L1)/layer 2 (L2) based inter-cell mobility generally refers to a technique for UE handover from a PCI to one or more other PCIs using L1 or L2 signalling. L1 signalling may include downlink control information (DCI), and L2 signalling may include a medium access control (MAC)-control element (CE). L1/L2 based inter-cell mobility allows for a more rapid handover between cells as compared to conventional implementations where handover is performed using higher-layer signalling such as RRC signalling.

L1/L2 based inter-cell mobility may include an implementation where each serving cell has multiple PCIs for remote radio headers (RRHs), the RRHs being at different physical locations. In this case, at each point in time, the base station (BS) (e.g., gNB) dynamically selects a subset of PCIs of the same serving cell to serve the UE via L1/L2 signaling (e.g., DCI or MAC-CE). In other implementations, each serving cell may have a single PCI. In this case, at each point in time, the BS dynamically selects at least one serving cell to serving the UE via L1/L2 signaling. Certain aspects of the present disclosure are generally directed to techniques for determination (e.g., derivation) of a security key (e.g., $K_{gNB}$) after L1/L2 based inter-cell handover.

FIG. 5 is a flow diagram illustrating example operations 500 for wireless communication by a base station (BS), in accordance with certain aspects of the present disclosure. Operations 500 may be performed, for example, by BS 110a in the wireless communication network 100.

Operations 500 may be implemented as software components that are executed and run on one or more processors (e.g., controller/processor 340 of FIG. 2). Further, the transmission and reception of signals by the BS in operations 500 may be enabled, for example, by one or more antennas (e.g., antennas 334 of FIG. 2). In certain aspects, the transmission and/or reception of signals by the BS may be implemented via a bus interface of one or more processors (e.g., controller/processor 340) obtaining and/or outputting signals.

The operations 500 may begin, at block 505, by the BS transmitting, to a UE, lower layer signaling indicating that the UE is to handover to one or more first PCIs to be used for communication between the UE and the BS. At block 510, the BS communicates with the UE in accordance with a security key and using the one or more first PCIs, the security key being associated with a PCI. In some aspects, the BS may determine the security key for the communication with the UE.

Figure 6:
FIG. 6 is a flow diagram illustrating example operations for wireless communication by a UE, in accordance with certain aspects of the present disclosure.

FIG. 6 is a flow diagram illustrating example operations 600 for wireless communication by a UE, in accordance with certain aspects of the present disclosure. Operations 600 may be performed, for example, by UE 120a in the wireless communication network 100. Operations 600 may be complementary operations by the UE to the operations 500 performed by the BS.

Operations 600 may be implemented as software components that are executed and run on one or more processors (e.g., controller/processor 380 of FIG. 2). Further, the transmission and reception of signals by the UE in operations 600 may be enabled, for example, by one or more antennas (e.g., antennas 352 of FIG. 2). In certain aspects, the transmission and/or reception of signals by the UE may be implemented via a bus interface of one or more processors (e.g., controller/processor 380) obtaining and/or outputting signals.

The operations 600 may begin, at block 605, by the UE receiving lower layer signaling (e.g., DCI, MAC-CE, or a random access channel (RACH) message of a RACH procedure initiated by the UE) indicating that the UE is to handover to one or more first PCIs to be used for communication between the UE and a BS. At block 610, the UE communicates with the BS in accordance with the security key and using the one or more first PCIs, the security key being associated with a PCI. In some aspects, the UE may determine the security key for the communication with the BS in response to the lower layer signaling. In some aspects, the security key may be further determined based on an absolute radio-frequency channel number associated with the PCI, as described herein.

In some aspects, the UE may receive another lower layer signaling (e.g., for handover) indicating that the UE is to handover to one or more second PCIs to be used for communication by the UE. In some cases, the same security key may be used for communication using the one or more first PCIs and the one or more second PCIs if the one or more first PCIs and the one or more second PCIs are managed by the same central unit (CU) (e.g., unless the BS indicates a different PCI to be used for the determination of a security key to communicate using the one or more second PCIs). In some cases, if the one or more first PCIs include multiple PCIs, then the PCI used to determine the security key may be a default PCI of the multiple PCIs. For instance, the PCI used to determine the security key may be one of the multiple PCIs having the lowest or highest identifier (ID), or one of the multiple PCIs used for the communication first in time.

In some cases, the PCI may be indicated by the BS to the UE. For example, the UE may receive, from the BS, an indication of the PCI to be used for determining the security key.

In some aspects, the UE may receive one or more other lower layer signaling for handover, each indicating that the UE is to handover to one or more second PCIs to be used for communication by the UE. The UE may determine another security key after reception of each of the one or more other lower layer signaling to be used for the communication by the UE using the one or more second PCIs.

In some aspects, the UE may receive a configuration of a plurality of candidate PCIs, and derive a security key for each of the plurality of candidate PCIs. In this case, determining the security key may include selecting one of the derived security keys associated with the one or more first PCIs. In some aspects, the one or more first PCIs may include a single PCI, the one of the derived security keys being associated with the single PCI.

Figure 7:
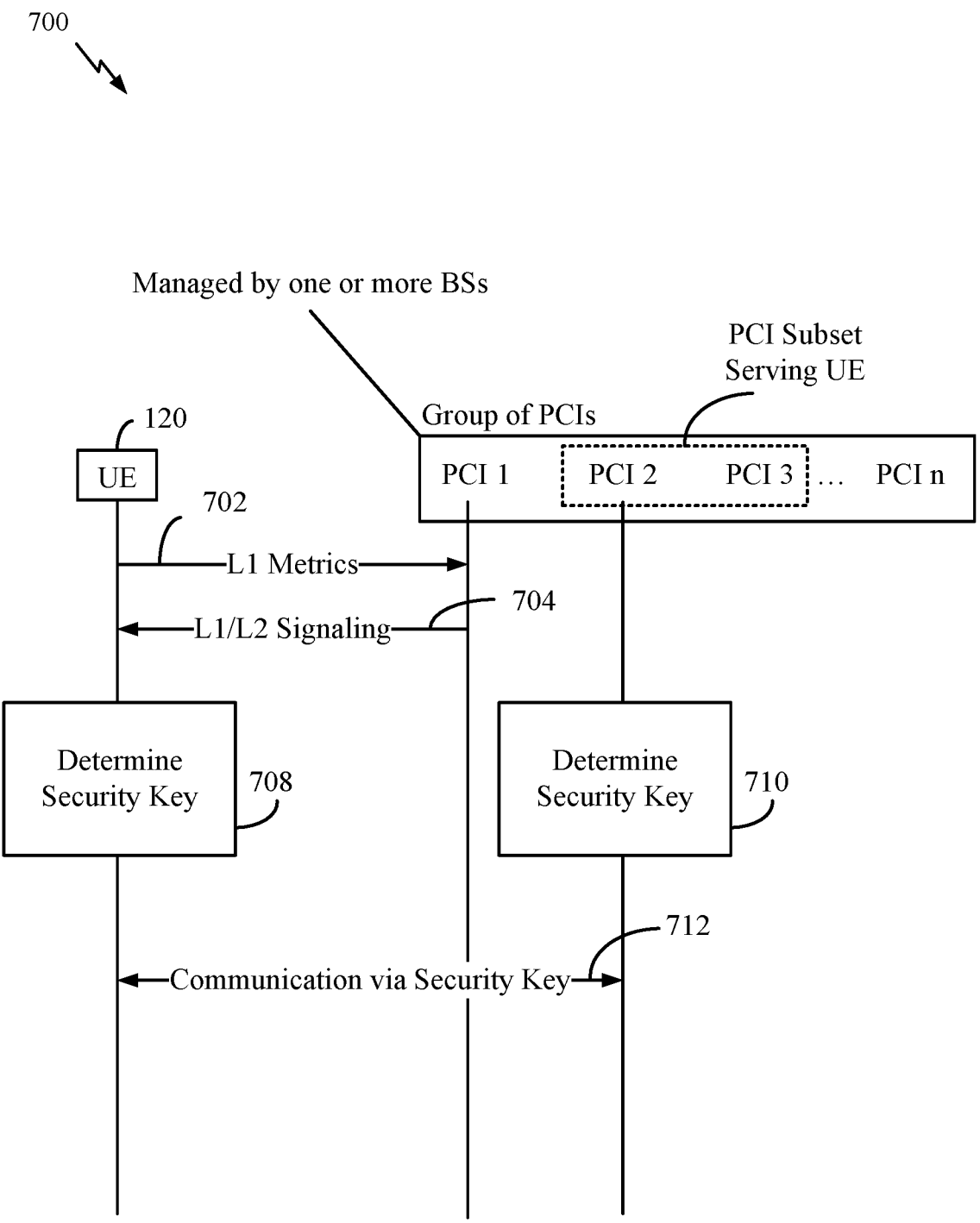
FIG. 7 illustrates a communication protocol for inter-cell mobility, in accordance with certain aspects of the present disclosure.

FIG. 7 illustrates a communication protocol 700 for L1/L2 inter-cell mobility, in accordance with certain aspects of the present disclosure. As illustrated, the UE 120 may optionally indicate an L1 metric 702 to a BS via a cell associated with PCI 1. The BS may then use the L1 metric 702 to select a subset of PCI(s) (e.g., PCI 2 and PCI 3) to serve the UE 120 and indicate the selected PCIs to the UE. While the PCI subset serving the UE includes multiple PCIs in the example communication protocol 700, the PCI subset may include only a single PCI in some cases. The indication of the subset of PCIs to serve the UE 120 may include L1 or L2 signaling 704, such as DCI or MAC-CE. As illustrated, at blocks 708, 710, the UE and the BS may determine a security key for communication between the UE and the BS. The security key may be associated with a PCI, and in some cases, the PCI may be a PCI of the selected PCI subset (e.g., the security key may be associated with either PCI 2 or PCI 3), while in other cases, the PCI may not be a PCI of the selected PCI subset (e.g., the security key may not be associated with either PCI 2 or PCI 3). At 712, UE 120 and the BS may perform communication 712 via the security key.

Certain aspects provide techniques for the determination of the security key after the L1/L2 based inter-cell handover, which may be applicable to both implementations of L1/L2 signalling as described herein (e.g., having multiple PCIs per serving cell, or a single PCI per serving cell). In some aspects, the security key may not change after the L1/L2 based inter-cell handover, at least in absence of explicit signaling to update the security key. This option may be used at least when both source (e.g., PCI 1) and target PCI(s)

(e.g., PCIs 2 and 3) are managed by the same gNB CU. That is, the same security key derived when this feature is enabled will be used in later handovers, as well. For instance, as long as the source and target PCI(s) are associated with the same serving cell, the security key may not be updated after the L1/L2 based inter-cell handover. With reference to FIG. 7, the same security key that was used when the UE was using PCI 1, may also be used after the UE is handed over to using PCI 2 and PCI 3, assuming that PCI 1, PCI 2, and PCI 3 are associated with the same serving cell.

As one example, the same security key may be determined by one default PCI and corresponding ARFCN-DL among all candidate PCIs for L1/L2 cell selection (e.g., the candidate PCI with the lowest value). For instance, with reference to FIG. 7, when PCI 2 and PCI 3 are selected to serve the UE, the default PCI for security key determination may be PCI 2 as PCI 2 has the lowest ID value.

As another example, the same security key may be determined by the PCI and corresponding ARFCN-DL of the first PCI selected to serve the UE when this feature is enabled. In other words, when multiple PCIs are selected to serve the UE (e.g., PCI 2 and PCI 3), the first PCI to be used for determining the security key may be the one with lowest or highest value, or determined based on an order index among all selected PCIs. For example, the first PCI may be the PCI (e.g., PCI 2) selected by the UE for communication first in time after handover.

In certain aspects, the security key may be updated based on explicit signaling from the BS. For example, the BS may indicate to the UE a designated PCI and corresponding ARFCN-DL, which may be used to derive the new security key. The designated PCI may or may not be one candidate PCI for L1/L2 based cell selection. For instance, with reference to FIG. 7, the BS may indicate that the UE is to use PCI 2, a candidate PCI, (or PCI 4, not a candidate PCI) for determination of the security key. In some aspects, the indication may be sent in an L1/L2 cell selection command or in separate signaling. For instance, the signaling 704 may be an L1/L2 cell selection command, and the PCI to be used for determining the security key may be part of the L1/L2 cell selection command.

In certain aspects, the security key may be implicitly updated after each L1/L2 cell selection based on a certain rule. For instance, the new security key may be derived by one PCI and corresponding ARFCN-DL. If only a single PCI is selected (e.g., the signaling 704 indicates only a single PCI to serve the UE), the one PCI for the security key derivation is the selected PCI. If multiple PCIs are selected (e.g., PCI 2 and PCI 3), the one PCI for the security key derivation is one of the selected PCIs, such as the one with the lowest/highest value, or order index, as described herein.

In some aspects, the BS may configure the UE with multiple candidate PCIs, and the UE may be configured to derive a security key for each of the multiple candidate PCIs. Whenever one PCI is selected via L1/L2 signaling to serve the UE, the UE selects the prepared (e.g., derived) security key for that PCI. In some aspects, the L1/L2 signaling may include DCI or MAC-CE sent from the BS, or a RACH message of a RACH procedure initiated by the UE.

In some aspects, one or multiple of the techniques described herein may be used simultaneously based on specification rule(s) or BS configuration. For instance, as described herein, the same security key may be used as long as a source PCI and one or more target PCIs are associated with the same serving cell, unless a new PCI to be used for key derivation is indicated by the BS. As another example, a security key may be derived implicitly using a certain configured rule, unless a different PCI, to be used for key derivation, is indicated by the BS.

Example Wireless Communications Devices

Figure 8:
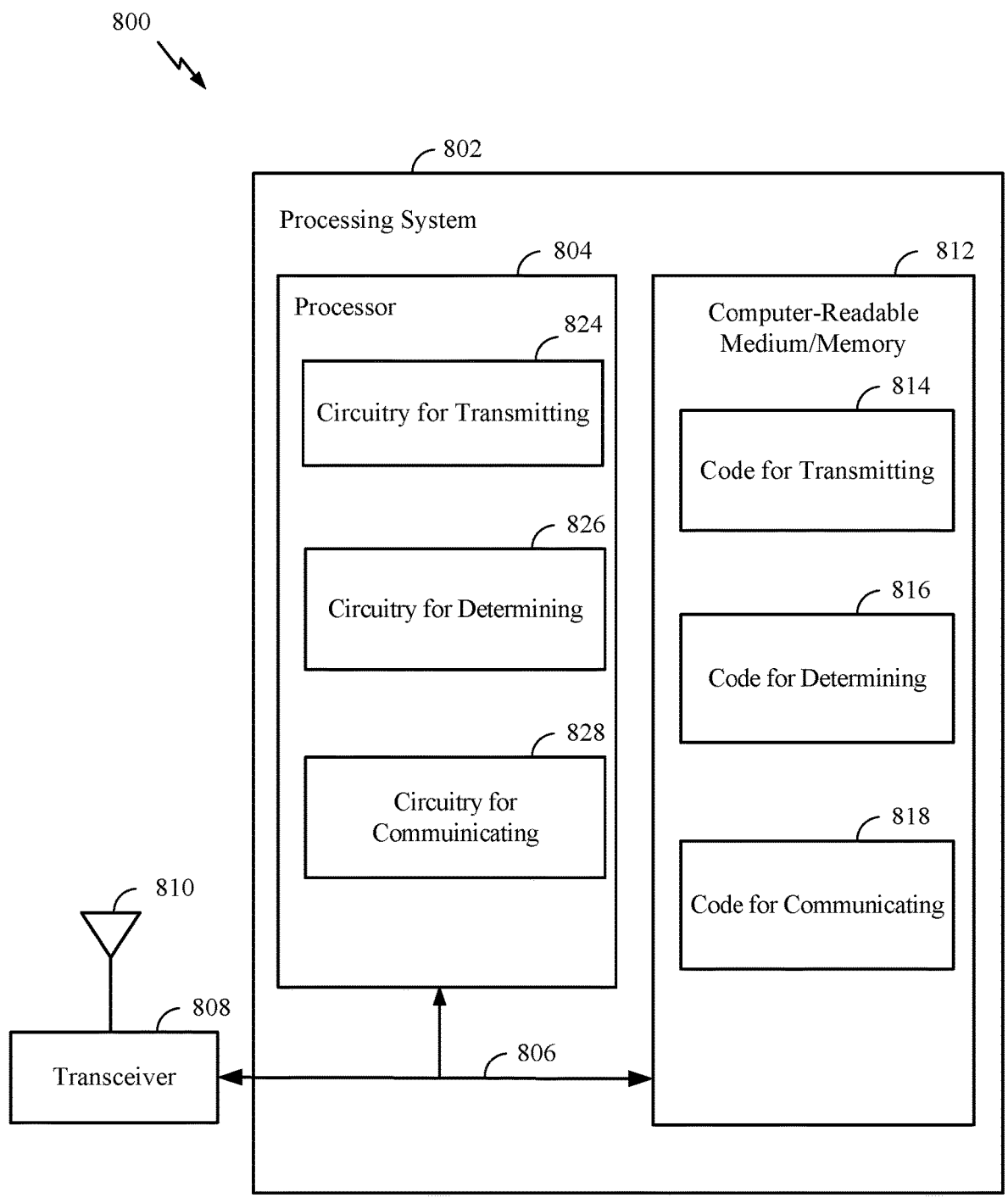
FIG. 8 illustrates a communications device that may include various components configured to perform operations for the techniques disclosed herein, in accordance with aspects of the present disclosure.

FIG. 8 illustrates a communications device 800 that may include various components (e.g., corresponding to means-plus-function components) operable, configured, or adapted to perform operations for the techniques disclosed herein, such as the operations illustrated in FIG. 5. In some examples, communications device 800 may be a BS, such as BS 110a as described, for example, with respect to FIGS. 1 and 3.

Communications device 800 includes a processing system 802 (e.g., corresponding to controller/processor 340) coupled to a transceiver 808 (e.g., a transmitter and/or a receiver). Transceiver 808 may correspond to one or more of the transmit processor 320, TX MIMO processor 330, modulator/demodulator 332, the receive processor 338, and the MIMO detector 336. Transceiver 808 is configured to transmit and receive signals for the communications device 800 via an antenna 810, such as the various signals as described herein. Processing system 802 may be configured to perform processing functions for the communications device 800, including processing signals received and/or to be transmitted by the communications device 800.

Processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, instruct or cause the processor 804 to perform the operations illustrated in FIG. 5, or other operations for performing the various techniques discussed herein for security key derivation.

In certain aspects, computer-readable medium/memory 812 (e.g., corresponding to memory 342) stores code 814 (an example means for) for transmitting; code 816 (an example means for) for determining; and code 818 (an example means for) for communicating.

In certain aspects, code 814 for transmitting may include code for transmitting, to a user equipment (UE), lower layer signaling indicating that the UE is to handover to one or more first physical cell identifiers (PCIs) to be used for communication between the UE and the BS. In certain aspects, code 814 for transmitting may include code for transmitting another lower layer signaling indicating that the UE is to handover to one or more second PCIs to be used for communication by the UE, and wherein the same security key is used for communication using the one or more first PCIs and the one or more second PCIs if the one or more first PCIs and the one or more second PCIs are managed by the same central unit (CU). In certain aspects, code 814 for transmitting may include code for transmitting, to the UE, an indication of the PCI associated with the security key. In certain aspects, code 814 for transmitting may include code for transmitting one or more other lower layer signaling, each indicating that the UE is to handover to one or more second PCIs to be used for communication by the UE. In certain aspects, circuitry 824 for transmitting may include circuitry for transmitting, to the UE, a configuration of a plurality of candidate PCIs. In certain aspects, code 816 for determining may include code for determining a security key for the communication based on a PCI. In certain aspects, code 816 for determining may include code for determining another security key to be used after each of the one or more other lower layer signaling for the communication by the UE using the one or more second PCIs. In certain aspects, code 818 for communicating may include code for communicating with the UE in accordance with a security key and using the one or more first PCIs, the security key being associated with a PCI.

In certain aspects, the processor 804 has circuitry configured to implement the code stored in the computer-readable medium/memory 812. The processor 804 includes circuitry 824 (an example means for) for transmitting; circuitry 826 (an example means for) for determining a security key for the communication based on a PCI; and circuitry 828 (an example means for) for communicating with the UE in accordance with the security key and using the one or more first PCIs.

In certain aspects, circuitry 824 for transmitting may include circuitry for transmitting, to a UE, lower layer signaling indicating that the UE is to handover to one or more first PCIs to be used for communication between the UE and the BS. In certain aspects, circuitry 824 for transmitting may include circuitry for transmitting another lower layer signaling indicating that the UE is to handover to one or more second PCIs to be used for communication by the UE, and wherein the same security key is used for communication using the one or more first PCIs and the one or more second PCIs if the one or more first PCIs and the one or more second PCIs are managed by the same CU. In certain aspects, circuitry 824 for transmitting may include circuitry for transmitting, to the UE, an indication of the PCI associated with the security key. In certain aspects, circuitry 824 for transmitting may include circuitry for transmitting one or more other lower layer signaling, each indicating that the UE is to handover to one or more second PCIs to be used for communication by the UE. In certain aspects, circuitry 824 for transmitting may include circuitry for transmitting, to the UE, a configuration of a plurality of candidate PCIs. In certain aspects, circuitry 826 for determining may include circuitry for determining a security key for the communication based on a PCI. In certain aspects, circuitry 826 for determining may include circuitry for determining another security key to be used after each of the one or more other lower layer signaling for the communication by the UE using the one or more second PCIs. In certain aspects, circuitry 828 for communicating may include circuitry for communicating with the UE in accordance with a security key and using the one or more first PCIs, the security key being associated with a PCI.

Figure 9:
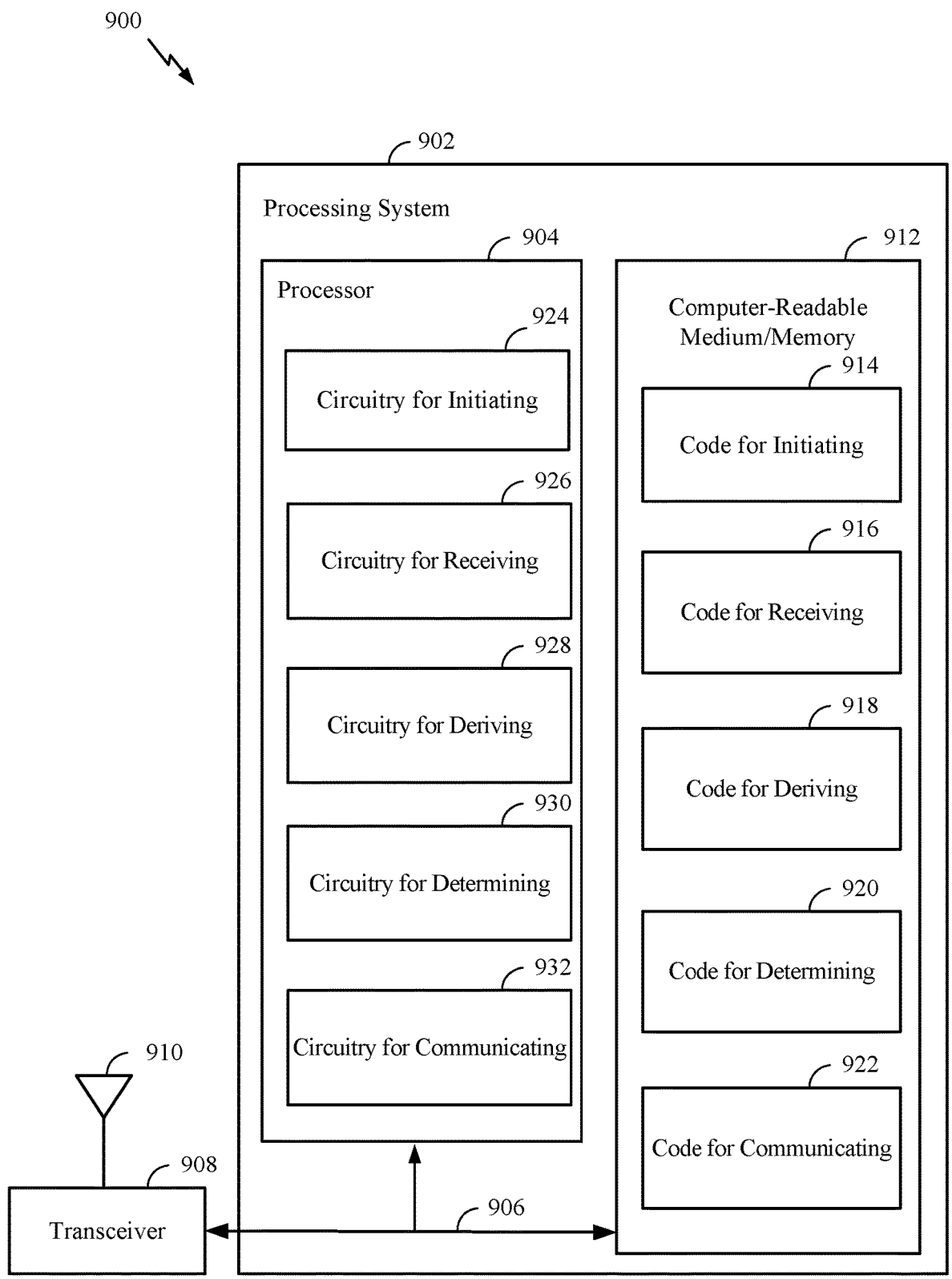
FIG. 9 illustrates a communications device that may include various components configured to perform operations for the techniques disclosed herein, in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations illustrated in FIG. 6. In some examples, communication device 900 may be a UE, such as UE 120a as described, for example with respect to FIGS. 1 and 3.

Communications device 900 includes a processing system 902 (e.g., corresponding to controller/processor 380) coupled to a transceiver 908 (e.g., a transmitter and/or a receiver). Transceiver 908 may correspond to one or more of the transmit processor 364, TX MIMO processor 366, modulator/demodulator 354, the receive processor 358, and the MIMO detector 356. Transceiver 908 is configured to transmit and receive signals for the communications device 900 via an antenna 910, such as the various signals as described herein. Processing system 902 may be configured to perform processing functions for the communications device 900, including processing signals received and/or to be transmitted by the communications device 800.

Processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for security key derivation.

In certain aspects, computer-readable medium/memory 912 stores code 914 (an example means for) for initiating; code 916 (an example means for) for receiving; code 918 (an example means for) for deriving; code 920 (an example means for) for determining; and code 922 (an example means for) for communicating.

In certain aspects code 914 for initiating may include code for initiating a random access channel (RACH) procedure, wherein the lower layer signaling comprises a RACH message of the RACH procedure. In certain aspects code 916 for receiving may include code for receiving lower layer signaling indicating that the UE is to handover to one or more first PCIs to be used for communication between the UE and a BS. In certain aspects code 916 for receiving may include code for receiving another lower layer signaling indicating that the UE is to handover to one or more second PCIs to be used for communication by the UE, and wherein the same security key is used for communication using the one or more first PCIs and the one or more second PCIs if the one or more first PCIs and the one or more second PCIs are managed by the same CU. In certain aspects code 916 for receiving may include code for receiving, from the BS, an indication of the PCI associated with the security key. In certain aspects code 916 for receiving may include code for receiving one or more other lower layer signaling, each indicating that the UE is to handover to one or more second PCIs to be used for communication by the UE. In certain aspects code 916 for receiving may include code for receiving a configuration of a plurality of candidate PCIs. In certain aspects code 918 for deriving may include code for deriving a security key for each of the plurality of candidate PCIs, wherein communicating with the BS in accordance with the security key comprises communicating with the BS in accordance with one of the derived security keys associated with the one or more first PCIs and selected by the UE. In certain aspects code 920 for determining may include code for determining a security key for the communication with the BS in response to the lower layer signaling, the security key being determined based on a PCI. In certain aspects code 920 for determining may include code for determining another security key after reception of each of the one or more other lower layer signaling to be used for the communication by the UE using the one or more second PCIs. In certain aspects code 922 for communicating may include code for communicating with the BS in accordance with a security key and using the one or more first PCIs, the security key being associated with a PCI.

In certain aspects, the processor 904 has circuitry configured to implement the code stored in the computer-readable medium/memory 912. The processor 904 includes circuitry 924 (an example means for) for initiating; circuitry 926 (an example means for) for receiving; and circuitry 928 (an example means for) for deriving; circuitry 930 (an example means for) for determining; and circuitry 932 (an example means for) for communicating.

In certain aspects circuitry 924 for initiating may include circuitry for initiating a RACH procedure, wherein the lower layer signaling comprises a RACH message of the RACH procedure. In certain aspects circuitry 926 for receiving may include circuitry for receiving lower layer signaling indicating that the UE is to handover to one or more first PCIs to be used for communication between the UE and a BS. In certain aspects circuitry 926 for receiving may include circuitry for receiving another lower layer signaling indicating that the UE is to handover to one or more second PCIs to be used for communication by the UE, and wherein the same security key is used for communication using the one or more first PCIs and the one or more second PCIs if the one or more first PCIs and the one or more second PCIs are managed by the same CU. In certain aspects circuitry 926 for receiving may include circuitry for receiving, from the BS, an indication of the PCI associated with the security key. In certain aspects circuitry 926 for receiving may include circuitry for receiving one or more other lower layer signaling, each indicating that the UE is to handover to one or more second PCIs to be used for communication by the UE. In certain aspects circuitry 926 for receiving may include circuitry for receiving a configuration of a plurality of candidate PCIs. In certain aspects circuitry 928 for deriving may include circuitry for deriving a security key for each of the plurality of candidate PCIs, wherein communicating with the BS in accordance with the security key comprises communicating with the BS in accordance with one of the derived security keys associated with the one or more first PCIs and selected by the UE. In certain aspects circuitry 930 for determining may include circuitry for determining a security key for the communication with the BS in response to the lower layer signaling, the security key being determined based on a PCI. In certain aspects circuitry 930 for determining may include circuitry for determining another security key after reception of each of the one or more other lower layer signaling to be used for the communication by the UE using the one or more second PCIs. In certain aspects circuitry 928 for communicating may include circuitry for communicating with the BS in accordance with a security key and using the one or more first PCIs, the security key being associated with a PCI.

The security manager 122 or 112 may support wireless communication in accordance with examples as disclosed herein.

The security manager 122 or 112 may be an example of means for performing various aspects described herein. The security manager 122 or 112, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the security manager 122 or 112, or its sub-components, may be implemented in code (e.g., as configuration management software or firmware) executed by a processor, or any combination thereof. If implemented in code executed by a processor, the functions of the security manager 122 or 112, or its sub-components may be executed by a general-purpose processor, a DSP, an ASIC, a FPGA or other programmable logic device.

In some examples, the security manager 122 or 112 may be configured to perform various operations (e.g., receiving, determining, transmitting) using or otherwise in cooperation with the transceiver 808 or 908.

The security manager 122 or 112, or its sub-components, may be physically located at various positions, including being distributed such that portions of functions are implemented at different physical locations by one or more physical components. In some examples, the security manager 122 or 112, or its sub-components, may be a separate and distinct component in accordance with various aspects of the present disclosure. In some examples, the security manager 122 or 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communication by a user equipment (UE), comprising: receiving lower layer signaling indicating that the UE is to handover to one or more first physical cell identifiers (PCIs) to be used for communication between the UE and a base station (BS); and communicating with the BS in accordance with a security key and using the one or more first PCIs, the security key being associated with a PCI.

Clause 2: The method of Clause 1, wherein the lower layer signaling comprises medium access control (MAC)-control element (CE) or downlink control information (DCI).

Clause 3: The method of Clause 1 or 2, further comprising initiating a random access channel (RACH) procedure, wherein the lower layer signaling comprises a RACH message of the RACH procedure.

Clause 4: The method of any of Clauses 1-3, wherein the security key is determined based on an absolute radio-frequency channel number associated with the PCI.

Clause 5: The method of any of Clauses 1-4, further comprising receiving another lower layer signaling indicating that the UE is to handover to one or more second PCIs to be used for communication by the UE, wherein the same security key is used for communication using the one or more first PCIs and the one or more second PCIs if the one or more first PCIs and the one or more second PCIs are managed by the same central unit (CU).

Clause 6: The method of Clause 5, wherein the same security key is used for communication using the one or more first PCIs and the one or more second PCIs unless the BS indicates a different PCI associated with a security key to communicate using the one or more second PCIs.

Clause 7: The method of Clause 5 or 6, wherein the one or more first PCIs comprise a plurality of PCIs, and wherein the PCI associated with the security key comprises a default PCI of the plurality of PCIs.

Clause 8: The method of any of Clauses 5-7, wherein the one or more first PCIs comprise a plurality of PCIs, and wherein the PCI associated with the security key comprises one of the plurality of PCIs having a lowest or highest identifier (ID).

Clause 9: The method of any of Clauses 5-8, wherein the one or more first PCIs comprise a plurality of PCIs, and wherein the PCI associated with the security key comprises one of the plurality of PCIs used for the communication first in time.

Clause 10: The method of any of Clauses 1-9, further comprising receiving, from the BS, an indication of the PCI associated with the security key.

Clause 11: The method of Clause 10, wherein the PCI is one of the one or more first PCIs indicated via the lower layer signaling.

Clause 12: The method of Clause 10 or 11, wherein the PCI is different than the one or more first PCIs indicated via the lower layer signaling.

Clause 13: The method of any of Clauses 10-12, wherein the lower layer signaling comprises a cell selection command for handover of the UE to the one or more first PCIs, the cell selection command further comprising the indication of the PCI associated with the security key.

Clause 14: The method of any of Clauses 1-13, further comprising: receiving one or more other lower layer signaling, each indicating that the UE is to handover to one or more second PCIs to be used for communication by the UE; and determining another security key after reception of each of the one or more other lower layer signaling to be used for the communication by the UE using the one or more second PCIs.

Clause 15: The method of any of Clauses 1-14, further comprising: receiving a configuration of a plurality of candidate PCIs; and deriving a security key for each of the plurality of candidate PCIs, wherein communicating with the BS comprises communicating with the BS in accordance with one of the derived security keys associated with the one or more first PCIs.

Clause 16: The method of Clause 15, wherein the one or more first PCIs comprises a single PCI, the one of the derived security keys being associated with the single PCI.

Clause 17: A method for wireless communication by a base station (BS), comprising: transmitting, to a user equipment (UE), lower layer signaling indicating that the UE is to handover to one or more first physical cell identifiers (PCIs) to be used for communication between the UE and the BS; and communicating with the UE in accordance with a security key and using the one or more first PCIs, the security key being associated with a PCI.

Clause 18: The method of Clause 17, wherein the security key is determined based on an absolute radio-frequency channel number associated with the PCI.

Clause 19: The method of Clause 17 or 18, further comprising transmitting another lower layer signaling indicating that the UE is to handover to one or more second PCIs to be used for communication by the UE, wherein the same security key is used for communication using the one or more first PCIs and the one or more second PCIs if the one or more first PCIs and the one or more second PCIs are managed by the same central unit (CU).

Clause 20: The method of Clause 19, wherein the same security key is used for communication using the one or more first PCIs and the one or more second PCIs unless the BS indicates, to the UE, that a different PCI is to be associated with a security key to communicate using the one or more second PCIs.

Clause 21: The method of Clause 19 or 20, wherein the one or more first PCIs comprise a plurality of PCIs, and wherein the PCI associated with the security key comprises a default PCI of the plurality of PCIs.

Clause 22: The method of any of Clauses 19-21, wherein the one or more first PCIs comprise a plurality of PCIs, and wherein the PCI used to determine the security key comprises one of the plurality of PCIs having the lowest or highest identifier (ID).

Clause 23: The method of any of Clauses 19-22, wherein the one or more first PCIs comprise a plurality of PCIs, and wherein the PCI associated with the security key comprises one of the plurality of PCIs used for the communication first in time.

Clause 24: The method of any of Clauses 17-23, further comprising transmitting, to the UE, an indication of the PCI associated with the security key.

Clause 25: The method of Clause 24, wherein the PCI is one of the one or more first PCIs indicated via the lower layer signaling.

Clause 26: The method of Clause 24 or 25, wherein the lower layer signaling comprises a cell selection command for handover of the UE to the one or more first PCIs, the cell selection command further comprising the indication of the PCI associated with the security key.

Clause 27: The method of any of Clauses 17-26, further comprising: transmitting one or more other lower layer signaling, each indicating that the UE is to handover to one or more second PCIs to be used for communication by the UE; and determining another security key to be used after each of the one or more other lower layer signaling for the communication by the UE using the one or more second PCIs.

Clause 28: The method of any of Clauses 17-27, further comprising transmitting, to the UE, a configuration of a plurality of candidate PCIs.

Clause 29: An apparatus, comprising: a memory; and one or more processors coupled to the memory, the one or more processors and the memory being configured to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   receiving lower layer signaling indicating that the UE is to handover to one or more first physical cell identifiers (PCIs) to be used for communication between the UE and a base station (BS);
   communicating with the BS in accordance with a security key and using the one or more first PCIs, the security key being associated with a PCI; and
   receiving another lower layer signaling indicating that the UE is to handover to one or more second PCIs to be used for communication by the UE, wherein the same security key is used for communication using the one or more first PCIs and the one or more second PCIs when the one or more first PCIs and the one or more second PCIs are managed by a same central unit (CU).

2. The method of claim 1, wherein the lower layer signaling comprises medium access control (MAC)-control element (CE) or downlink control information (DCI).

3. The method of claim 1, further comprising initiating a random access channel (RACH) procedure, wherein the lower layer signaling comprises a RACH message of the RACH procedure.

4. The method of claim 1, wherein the security key is determined based on an absolute radio-frequency channel number associated with the PCI.

5. The method of claim 1, wherein the same security key is used for communication using the one or more first PCIs and the one or more second PCIs unless the BS indicates a different PCI associated with a security key to communicate using the one or more second PCIs.

6. The method of claim 1, wherein the one or more first PCIs comprise a plurality of PCIs, and wherein the PCI associated with the security key comprises a default PCI of the plurality of PCIs.

7. The method of claim 1, wherein the one or more first PCIs comprise a plurality of PCIs, and wherein the PCI associated with the security key comprises one of the plurality of PCIs having a lowest or highest identifier (ID).

8. The method of claim 1, wherein the one or more first PCIs comprise a plurality of PCIs, and wherein the PCI associated with the security key comprises one of the plurality of PCIs used for a communication first in time.

9. The method of claim 1, further comprising receiving, from the BS, an indication of the PCI associated with the security key.

10. The method of claim 9, wherein the PCI is one of the one or more first PCIs indicated via the lower layer signaling.

11. The method of claim 9, wherein the PCI is different than the one or more first PCIs indicated via the lower layer signaling.

12. The method of claim 9, wherein the lower layer signaling comprises a cell selection command for handover of the UE to the one or more first PCIs, the cell selection command further comprising the indication of the PCI associated with the security key.

13. The method of claim 1, further comprising:
   receiving a configuration of a plurality of candidate PCIs; and
   deriving a first security key for each of the plurality of candidate PCIs, wherein communicating with the BS in accordance with the security key comprises communicating with the BS in accordance with one of the derived first security keys associated with the one or more first PCIs.

14. The method of claim 13, wherein the one or more first PCIs comprises a single PCI, the one of the derived first security keys being associated with the single PCI.

15. A method for wireless communication by a user equipment (UE), comprising:
   receiving lower layer signaling indicating that the UE is to handover to one or more first physical cell identifiers (PCIs) to be used for communication between the UE and a base station (BS);
   communicating with the BS in accordance with a security key and using the one or more first PCIs, the security key being associated with a PCI;
   receiving one or more other lower layer signaling, each indicating that the UE is to handover to one or more second PCIs to be used for communication by the UE; and
   determining another security key after reception of each of the one or more other lower layer signaling to be used for the communication by the UE using the one or more second PCIs.

16. A method for wireless communication by a base station (BS), comprising:
   transmitting, to a user equipment (UE), lower layer signaling indicating that the UE is to handover to one or more first physical cell identifiers (PCIs) to be used for communication between the UE and the BS;
   communicating with the UE in accordance with a security key and using the one or more first PCIs, the security key being associated with a PCI; and
   transmitting another lower layer signaling indicating that the UE is to handover to one or more second PCIs to be used for communication by the UE, wherein the same security key is used for communication using the one or more first PCIs and the one or more second PCIs when the one or more first PCIs and the one or more second PCIs are managed by a same central unit (CU).

17. The method of claim 16, wherein the security key is determined based on an absolute radio-frequency channel number associated with the PCI.

18. The method of claim 16, wherein the same security key is used for communication using the one or more first PCIs and the one or more second PCIs unless the BS indicates, to the UE, that a different PCI is to be associated with a security key to communicate using the one or more second PCIs.

19. The method of claim 16, wherein the one or more first PCIs comprise a plurality of PCIs, and wherein the PCI associated with the security key comprises a default PCI of the plurality of PCIs.

20. The method of claim 16, wherein the one or more first PCIs comprise a plurality of PCIs, and wherein the PCI used to determine the security key comprises one of the plurality of PCIs having the lowest or highest identifier (ID).

21. The method of claim 16, wherein the one or more first PCIs comprise a plurality of PCIs, and wherein the PCI associated with the security key comprises one of the plurality of PCIs used for a communication first in time.

22. The method of claim 16, further comprising transmitting, to the UE, an indication of the PCI associated with the security key.

23. The method of claim 22, wherein the PCI is one of the one or more first PCIs indicated via the lower layer signaling.

24. The method of claim 22, wherein the lower layer signaling comprises a cell selection command for handover of the UE to the one or more first PCIs, the cell selection command further comprising the indication of the PCI associated with the security key.

25. A method for wireless communication by a base station (BS), comprising:
  transmitting, to a user equipment (UE), lower layer signaling indicating that the UE is to handover to one or more first physical cell identifiers (PCIs) to be used for communication between the UE and the BS;
  communicating with the UE in accordance with a security key and using the one or more first PCIs, the security key being associated with a PCI;
  transmitting one or more other lower layer signaling, each indicating that the UE is to handover to one or more second PCIs to be used for communication by the UE; and
  determining another security key to be used after each of the one or more other lower layer signaling for the communication by the UE using the one or more second PCIs.

26. The method of claim 16, further comprising transmitting, to the UE, a configuration of a plurality of candidate PCIs.

27. An apparatus for wireless communication by a user equipment (UE), comprising:
  a memory; and
  one or more processors coupled to the memory, the memory and the one or more processors being configured to:
    receive lower layer signaling indicating that the UE is to handover to one or more first physical cell identifiers (PCIs) to be used for communication between the UE and a base station (BS);
    communicate with the BS in accordance with the a security key and using the one or more first PCIs, the security key being associated with a PCI; and
    receive another lower layer signaling indicating that the UE is to handover to one or more second PCIs to be used for communication by the UE, wherein the same security key is used for communication using the one or more first PCIs and the one or more second PCIs when the one or more first PCIs and the one or more second PCIs are managed by a same central unit (CU).

28. An apparatus for wireless communication by a base station (BS), comprising:
  a memory; and
  one or more processors coupled to the memory, the memory and the one or more processors being configured to:
    transmit, to a user equipment (UE), lower layer signaling indicating that the UE is to handover to one or more first physical cell identifiers (PCIs) to be used for communication between the UE and the BS;
    communicate with the UE in accordance with a security key and using the one or more first PCIs, the security key being associated with a PCI; and
    transmit another lower layer signaling indicating that the UE is to handover to one or more second PCIs to be used for communication by the UE, wherein the same security key is used for communication using the one or more first PCIs and the one or more second PCIs if the one or more first PCIs and the one or more second PCIs are managed by a same central unit (CU).

29. An apparatus for wireless communication by a user equipment (UE), comprising:
  a memory; and
  one or more processors coupled to the memory, the memory and the one or more processors being configured to:
    receive lower layer signaling indicating that the UE is to handover to one or more first physical cell identifiers (PCIs) to be used for communication between the UE and a base station (BS);
    communicate with the BS in accordance with a security key and using the one or more first PCIs, the security key being associated with a PCI;
    receive one or more other lower layer signaling, each indicating that the UE is to handover to one or more second PCIs to be used for communication by the UE; and
    determine another security key after reception of each of the one or more other lower layer signaling to be used for the communication by the UE using the one or more second PCIs.

30. An apparatus for wireless communication by a base station (BS), comprising:
  a memory; and
  one or more processors coupled to the memory, the memory and the one or more processors being configured to:
    transmit, to a user equipment (UE), lower layer signaling indicating that the UE is to handover to one or more first physical cell identifiers (PCIs) to be used for communication between the UE and the BS;
    communicate with the UE in accordance with a security key and using the one or more first PCIs, the security key being associated with a PCI;
    transmit one or more other lower layer signaling, each indicating that the UE is to handover to one or more second PCIs to be used for communication by the UE; and
    determine another security key to be used after each of the one or more other lower layer signaling for the communication by the UE using the one or more second PCIs.

* * * * *